(12) United States Patent
Pieri

(10) Patent No.: US 7,614,418 B2
(45) Date of Patent: Nov. 10, 2009

(54) WASHING APPARATUS AND A VALVE DEVICE COMPRISING SAID APPARATUS

(75) Inventor: Luciano Pieri, Lucca (IT)

(73) Assignee: Vima Impianti S.R.L., Porcari (Lucca) (IT)

( * ) Notice: Subject to any disclaimer, the term of this patent is extended or adjusted under 35 U.S.C. 154(b) by 605 days.

(21) Appl. No.: 11/138,400

(22) Filed: May 27, 2005

(65) Prior Publication Data

US 2005/0268951 A1     Dec. 8, 2005

(30) Foreign Application Priority Data

Jun. 8, 2004     (IT)     .......................... BO2004A0362

(51) Int. Cl.
*B65D 35/56*     (2006.01)

(52) U.S. Cl. ............... 137/240; 134/167 R; 134/167 C; 134/172

(58) Field of Classification Search .................. 137/240, 137/613, 238, 241, 237; 134/167 C, 167 R, 134/166 C, 172; 239/227
See application file for complete search history.

(56) References Cited

U.S. PATENT DOCUMENTS

| 3,791,583 | A |   | 2/1974 | Nunlist et al. |
| 4,466,142 | A | * | 8/1984 | Gould ............................ 4/490 |
| 4,846,212 | A |   | 7/1989 | Scobie et al. |
| 4,846,225 | A |   | 7/1989 | Scobie et al. |
| 5,497,799 | A | * | 3/1996 | Shenk ..................... 134/167 R |
| 7,213,606 | B2 | * | 5/2007 | Nanni ..................... 137/15.04 |

FOREIGN PATENT DOCUMENTS

| EP | 1 574 762 A2 | 9/2005 |
| WO | 95/32813 A1 | 12/1995 |

\* cited by examiner

*Primary Examiner*—Kevin L Lee
(74) *Attorney, Agent, or Firm*—Arent Fox LLP

(57) ABSTRACT

A washing apparatus, in particular for washing parts exposed to the presence and/or passage of a flow of loose material, said parts forming a chamber, comprising an orbital head for supporting at least one nozzle which dispenses a washing fluid in the chamber.

29 Claims, 6 Drawing Sheets

WASHING APPARATUS AND A VALVE DEVICE COMPRISING SAID APPARATUS

BACKGROUND OF THE INVENTION

The present invention relates to a washing apparatus, in particular an apparatus which can be used to wash parts exposed to the passage of a flow of loose material.

The apparatus disclosed can be used in particular in the chemical and/or pharmaceutical and/or food industry and in all cases involving the use of loose material consisting of powders, granulated materials, pellets, tablets, capsules or the like.

Above all, in the chemical and pharmaceutical industry, said loose materials must be handled in a substantially hermitic way, so that the spread of powders in the surrounding environment is kept within extremely tight limits.

The importance of the above-mentioned problem increases proportionally with the level at which the substances handled consist of chemical compounds or substances that are not easily degradable in the environment and in some cases potentially toxic or harmful.

Moreover, obviously, when passing from the processing of a first material to the processing of a second, different material, all parts exposed to the passage of the first loose material must be thoroughly cleaned.

The following description refers, by way of example and without in any way limiting the scope of the inventive concept, to a part exposed to said loose material which consists of a valve device of the type that can be used in an apparatus for unloading loose material from a dispensing unit to a user unit.

Said valve device normally consists of a first butterfly valve integral with the dispensing unit, a spacer element and a second butterfly valve integral with the latter.

Each butterfly valve has a flat disk-shaped shutter element that rotates in both directions about a horizontal axis between a position in which the lower end of the dispensing unit is closed, with the shutter lying in a substantially horizontal plane, and an open position, with the shutter lying in a substantially vertical plane, allowing the material to be unloaded from the dispensing unit to the user unit or machine which uses the loose material for subsequent processing.

At the end of loose material unloading, the dispensing unit valve and the spacer valve are closed and, before the dispensing unit is separated from the other parts, the inside of the valve device is washed.

Said washing is normally carried out using directional nozzles giving onto the internal surface of the spacer element, to clean the surfaces of the two valves which will be in contact with the external environment.

However, the solution just described is not without disadvantages, mainly due to the considerable dimensions of the valve device which make its thorough washing difficult.

Moreover, the use of nozzles arranged on the side surface of the spacer element does not guarantee thorough cleaning of the valves and in particular of their central zone.

SUMMARY OF THE INVENTION

The aim of the present invention is, therefore, to overcome the above-mentioned disadvantages with a washing apparatus which is effective, with practical, functional use.

The present invention also relates to a valve device which can be used in a unit for unloading loose material from a dispensing device to a user unit, the valve device being equipped with a washing apparatus which guarantees thorough, deep cleaning of all surfaces of the valve device exposed to contact with the loose material.

The technical features of the present invention, according to the afore-mentioned aims, are clearly described in the claims herein, in particular in claims 1 and 17, and in any of the claims directly or indirectly dependent on claims 1 and 17.

BRIEF DESCRIPTION OF THE DRAWINGS

The advantages of the present invention are more clearly illustrated in the detailed description which follows, with reference to the accompanying drawings, which illustrate preferred embodiments without limiting the scope of application, and in which.

DESCRIPTION OF THE PREFERRED EMBODIMENTS

Figure 1:
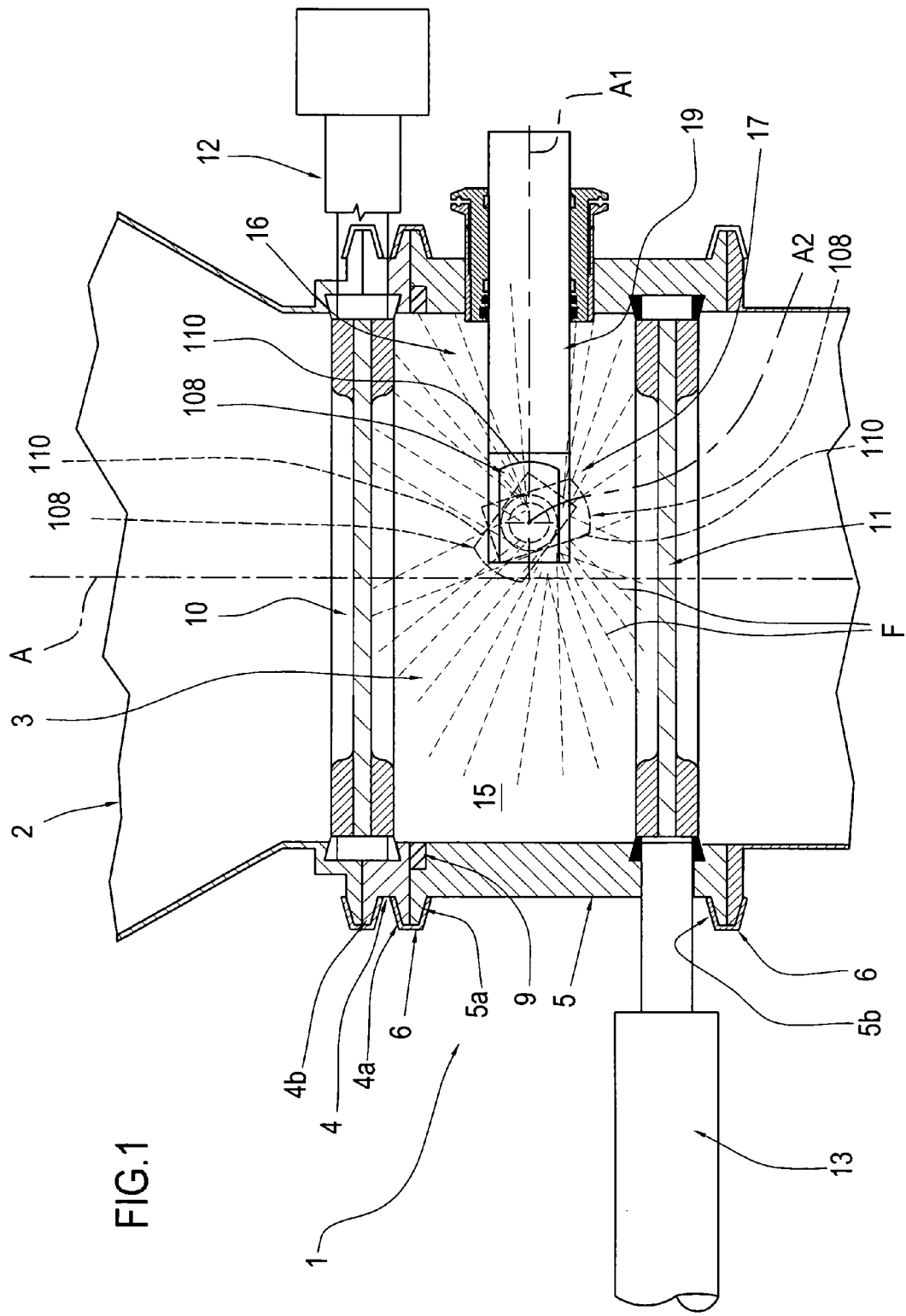
FIG. 1 is an elevation view with some parts in cross-section of a valve device according to the present invention.

With reference to the accompanying drawings, with reference to FIG. 1, the numeral 1 denotes a valve device, in particular a valve device 1 applied to a unit 2, of the known type and only partly illustrated, for unloading loose material.

The device 1 comprises a pipe 3, having a central axis A, the pipe 3 being formed by a first ring-shaped body 4, coaxially attached to a second ring-shaped body 5. Said ring-shaped elements 4 and 5 respectively have external profiles 4a, 4b, 5a and 5b, suitably shaped for connection 4a-5a with one another, and for connection with the unit 2 for unloading loose materials.

The above-mentioned connection 4a-5a with one another is guaranteed by removable connecting parts 6, placed at the opposite profiles 4a and 5a.

Advantageously, between the first and the second ring-shaped bodies 4, 5 a seal 9 is inserted, also preferably ring-shaped, designed to guarantee a sealed connection between the elements 4 and 5.

The first and the second ring-shaped bodies 4 and 5 respectively support a first closing element 10 and a second closing element 11.

The first closing element 10 is mobile between a first position in which it opens the pipe 3 and a second position in which it seals the pipe closed.

The second closing element 11 is mobile between a first position in which it opens the pipe 3 and a second position in which it seals the pipe closed.

The elements 10 and 11 lie, at the respective open positions not illustrated, in planes substantially parallel with the axis A and, at the respective closed positions, as illustrated in FIG. 1, in planes substantially perpendicular to the axis A.

The elements 10 and 11 are respectively connected, by way of example only, to a mechanical actuator 12 and to a pneumatic actuator 13 which drive the movement of the elements 10 and 11.

In embodiments not illustrated, said mechanical or pneumatic actuators 12 and 13 may also be fitted without distinction for one or the other closing element 10, 11 or for both and there may be more than one actuator per closing element 10 and 11, for example depending on the dimensions of the elements 10 and 11.

The actuators 12 and 13 are controlled by a check and control unit, not illustrated, for their synchronized or separate movement.

In other words, the closing elements 10 and 11 may be opened simultaneously or independently of one another even according to their reciprocal positioning.

The pipe 3 and the elements 10 and 11, in the respective closed positions, form a chamber 15.

Figure 2:
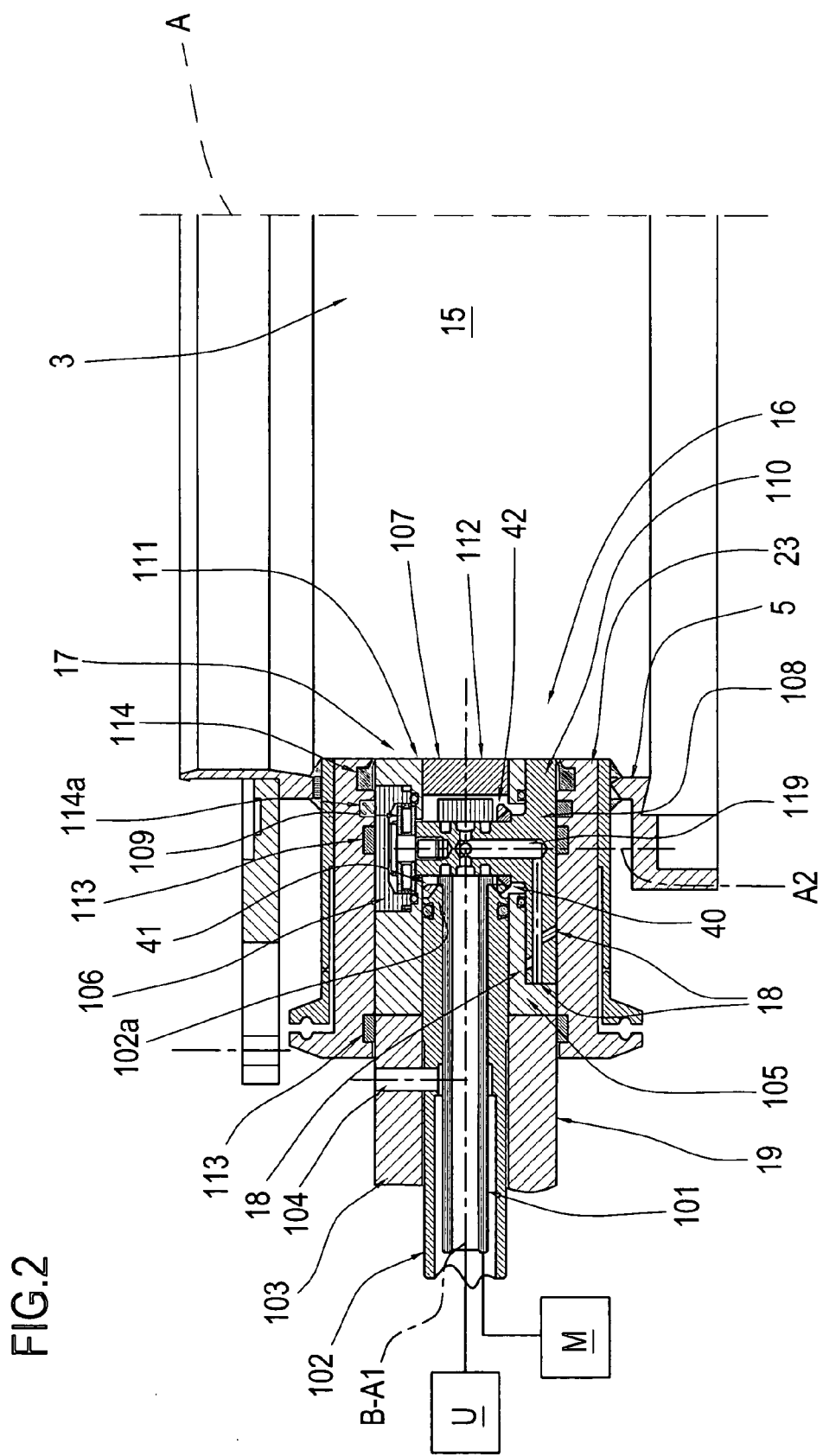
FIG. 2 is a schematic side view with some parts in cross-section of a first embodiment of the washing apparatus according to the present invention, in a second, non-operating configuration.
Figure 3:
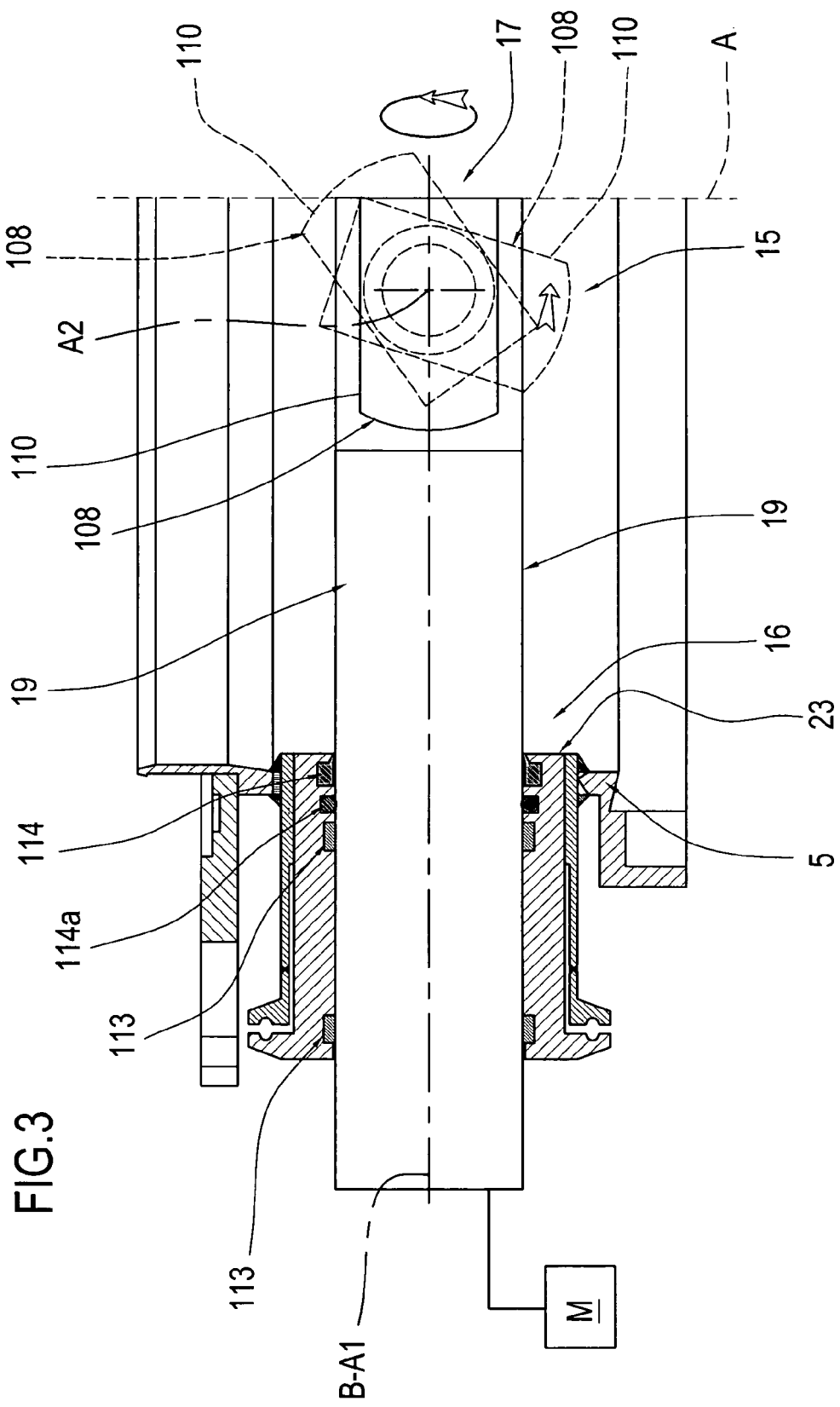
FIG. 3 is a schematic side view with some parts in cross-section of the washing apparatus illustrated in FIG. 2, in a first, operating configuration.

The device 1 comprises a washing apparatus 16, a first embodiment of which is illustrated in FIGS. 2 and 3, which comprises an orbital head 17 supporting a plurality of nozzles 18 for dispensing a washing fluid F and a mobile arm 19 to which the head 17 is operatively attached.

The head 17, driven by the arm 19, is mobile between a first, operating configuration, illustrated in FIG. 3, in which it is inserted in the chamber 15, and a second, non-operating configuration, illustrated in FIG. 2, in which it is outside the chamber 15.

In this text the term 'orbital' refers to the fact that the nozzles 18 supported by the head 17 are mobile in space.

In particular, in the preferred embodiments illustrated, the nozzles 18 supported by the head 17 rotate about a first axis of rotation A1 substantially transversal to the central axis A of the pipe 3, and about a second axis A2 transversal to the first axis A1 and in particular perpendicular to it.

The arm 19 supporting the orbital head 17 has a main axis of extension B. The first axis of rotation A1 substantially coincides with the main axis B of the arm 19.

As illustrated in FIG. 2, the washing apparatus 16 comprises a structure 23 which supports and houses the arm 19 and the head 17. The structure 23 is rigidly connected to the ring-shaped body 5.

The arm 19 comprises a hollow central shaft 101 which rotates, driven by motor means schematically illustrated in the accompanying drawings with a block M, about its axis A1, a first, internal sleeve 102 and a second, external sleeve 103 coaxial with one another and coaxial with the central shaft 101.

The first and the second sleeves 102, 103 are rigidly connected to one another by a pin 104.

The head 17, having a substantially cylindrical shape, in its second, non-operating configuration, is joined to the second sleeve 103.

The head 17 comprises a body 105, a first, side plug 106, a second, end plug 107 and a nozzle 18 supporting element 108.

The nozzles 18 are advantageously created using calibrated holes made in the element 108.

The nozzle 18 supporting element 108 is engaged in such a way that it moves idly on the body 105 by inserting an axial bearing 109 between them and rotates relative to the body 105 about the axis of rotation A2.

At one of its ends 102a connected to the head 17, keyed to the first sleeve 102 there is a first bevel gear 41 which meshes with a second bevel gear 42 integral with the nozzle supporting element 108.

The first bevel gear 41 and the second bevel gear 42 connect to form a bevel gear pair 40.

The supporting element 108, and consequently the nozzles 18 on it, therefore, turns about the axis A1, since it is integral with the shaft 101, and about the axis A2 since the meshing of the gears 41 and 42 induces this rotary motion.

Therefore, as explained in more detail below, the head 17, and more precisely the nozzle 18 supporting element 108, is mobile according to a law of motion consisting of a first rotary movement about the first axis A1 and a second rotary movement about the second axis A2.

Figure 6:
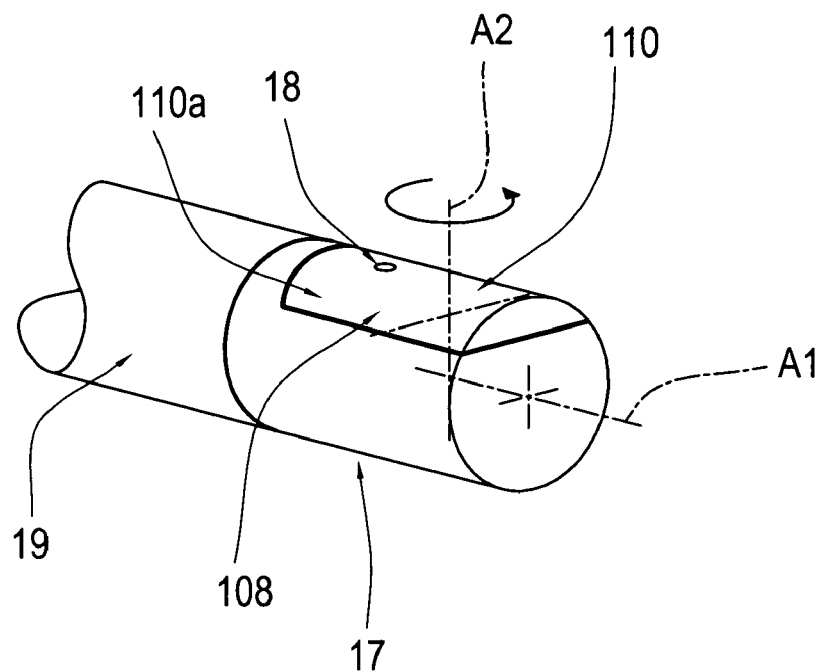
FIGS. 6 and 7 are respectively perspective views of a detail of the device illustrated in FIGS. 2, 3.
Figure 7:
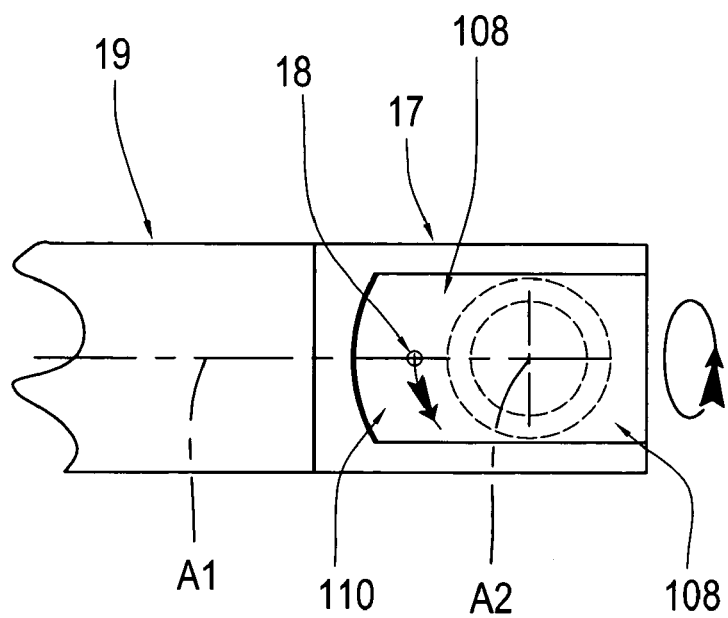

As illustrated in the detail in FIGS. 6 and 7, the nozzle 18 supporting element 108 comprises a portion 110 which roughly has the shape of a cylindrical segment.

The portion 110, being part of the element 108, can rotate about the axis A2 between an end position, illustrated in FIGS. 6 and 7, in which the generating lines of the cylindrical segment are substantially parallel with the axis A1, and a plurality of intermediate positions, illustrated with dashed lines in FIGS. 1 and 3, in which said generating lines are skew relative to the first axis A1.

The portion 110 which has the shape of a cylindrical segment has a curved face 110a connected to the rest of the head 17 to form said cylindrical head 17 shape.

The term cylindrical segment refers to a prism having a circular segment as its base. With reference to FIG. 6, in the embodiment of the portion 110 of the element 108 (which is described as 'roughly' having the shape of a cylindrical segment), one base of the prism is flat whilst the other is curved so as to allow rotation of the cylindrical segment about its axis A2. Said curvature can advantageously be used to make, on the head 17, a housing perfectly shaped to fit and such that it does not create any harmful zones for a build up of materials.

With reference to FIG. 2, the head 17 has an end portion 111 which, with the head 17 in its second, non-operating configuration, forms a wall 112 partly delimiting the chamber 15.

In detail, with reference to the apparatus 16, the end portion 111 of the head 17 consists of part of the body 105, one end of the portion 110 of the element 108 and the second plug 107.

Again with reference to the apparatus 16 illustrated in FIG. 2, the wall 112 is substantially flat and has a circular shape, it being possible to directly deduce said shape, even if not illustrated, from the fact that the head 17 is substantially cylindrical and the wall 112 forms a base of said cylindrical shape.

According to alternative embodiments not illustrated, the wall 112 of the end portion 111 of the cylindrical head 17 may be curved rather than flat, so that it fits better in the cylindrical chamber 15.

Figure 4:
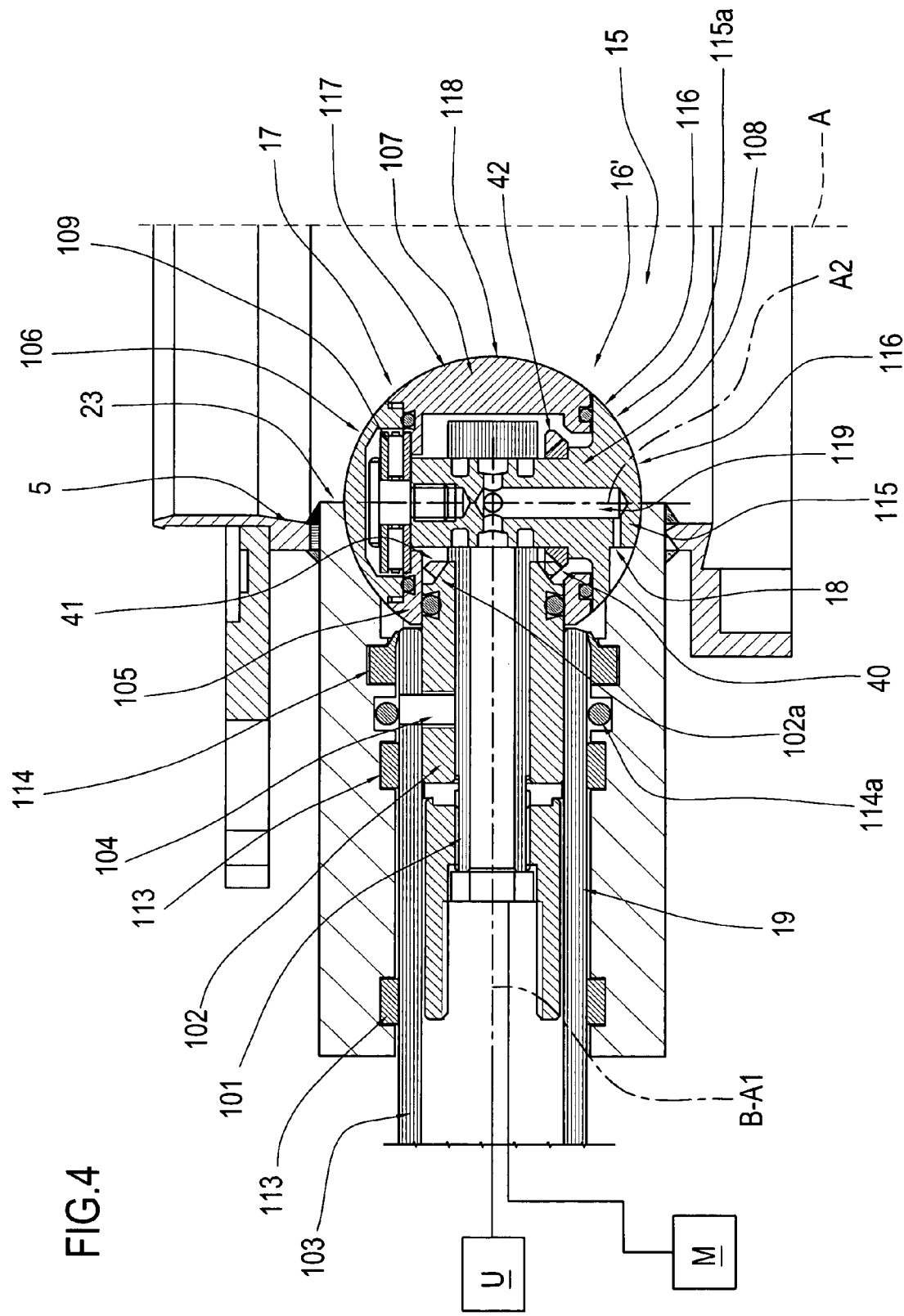
FIG. 4 is a schematic side view with some parts in cross-section of a second embodiment of the washing apparatus according to the present invention, in a second, non-operating configuration.
Figure 5:
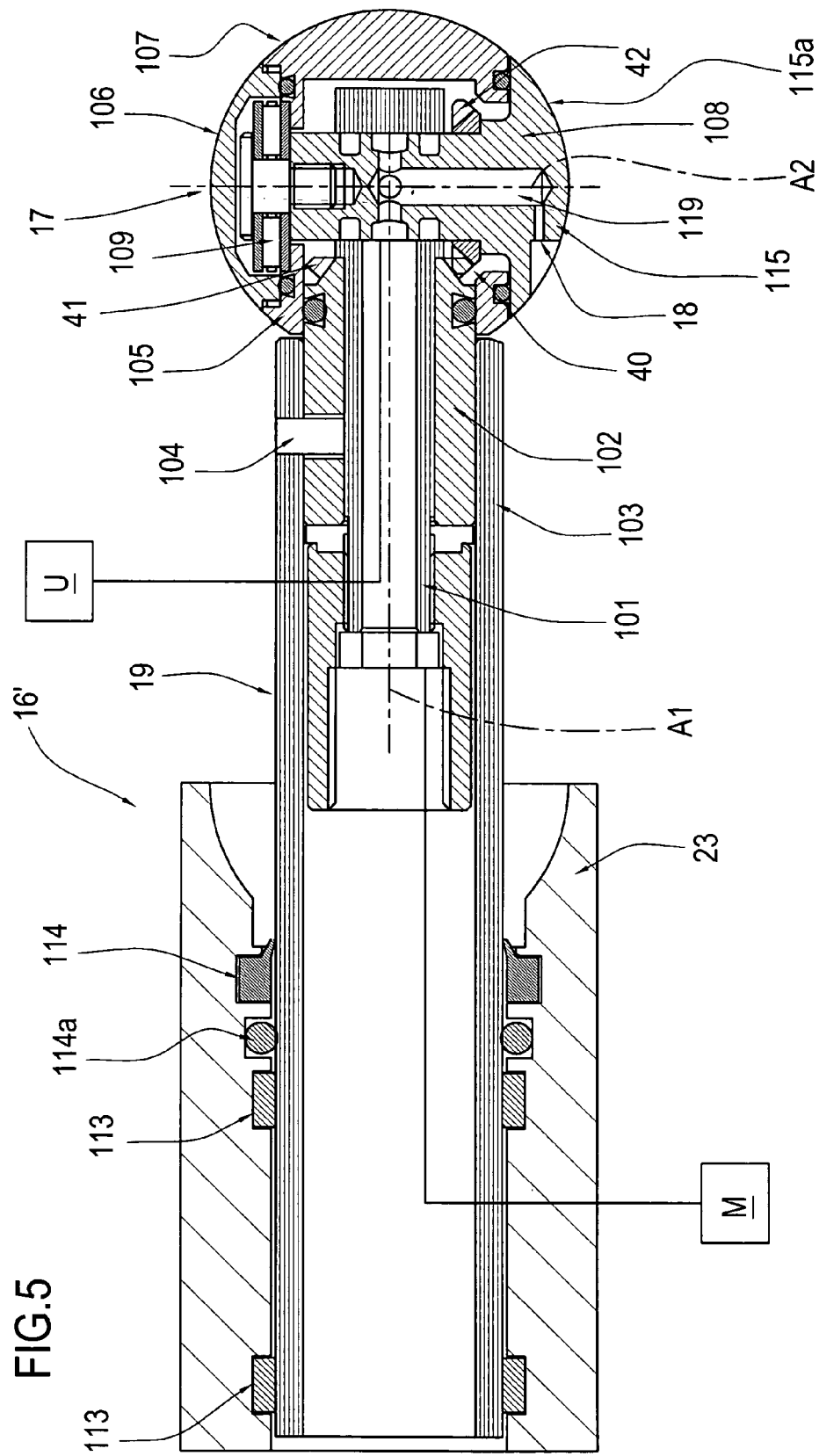
FIG. 5 is a schematic side view with some parts in cross-section of the washing apparatus illustrated in FIG. 2, in a first, operating configuration.

FIGS. 4 and 5 illustrate a second embodiment of a washing apparatus 16 according to the present invention.

In FIGS. 4 and 5, the apparatus is labeled 16' as a whole, but to simplify the description, its component parts corresponding and similar to those already described with reference to the apparatus 16 are labeled in FIGS. 4 and 5 with the same reference numbers as used in the previous Figures from 1 to 3.

The apparatus 16' comprises an orbital washing head 17 supporting a plurality of nozzles 18 for dispensing a washing fluid F, only one nozzle 18 being illustrated in FIGS. 4 and 5, and a mobile arm 19 to which said head 17 is operatively attached.

The head 17, driven by the arm 19, is mobile between a first, operating configuration, illustrated in FIG. 5, in which it is inserted in the chamber 15, and a second, non-operating configuration, illustrated in FIG. 4, in which it is outside the chamber 15.

Similarly to what is described above, the nozzles 18 supported by the head 17 rotate about a first axis of rotation A1 substantially transversal to the central axis A of the pipe 3, and about a second axis A2 transversal to the first axis A1 and in particular perpendicular to it.

The arm 19 supporting the orbital head 17 has a main axis of extension B. The first axis of rotation A1 substantially coincides with the main axis B of the arm 19.

As illustrated in FIGS. 4 and 5, the washing apparatus 16' comprises a structure 23 which supports and houses the arm 19 and the head 17. The structure 23 is rigidly connected to the ring-shaped body 5.

The arm 19 comprises a hollow central shaft 101 which rotates, driven by motor means schematically illustrated in the accompanying drawings with a block M, about its axis of rotation A1, a first, internal sleeve 102 and a second, external sleeve 103 coaxial with one another and coaxial with the central shaft 101.

The first and the second sleeves 102, 103 are rigidly connected to one another by a pin 104.

The head 17 is partly spherical in shape.

The head 17 comprises a body 105, a first, side plug 106, a second, end plug 107 and a nozzle 18 supporting element 108.

The nozzles 18 are advantageously created using calibrated holes made in the element 108.

The nozzle 18 supporting element 108 is engaged in such a way that it moves idly on the body 105 by inserting an axial bearing 109 between them and rotates relative to the body 105 about a respective axis of rotation A2.

At one of its ends 102a connected to the head 17, keyed to the first sleeve 102 there is a first bevel gear 41 which meshes with a second bevel gear 42 integral with the nozzle supporting element 108.

The first bevel gear 41 and the second bevel gear 42 connect to form a bevel gear pair 40.

The supporting element 108, and consequently the nozzles 18 on it, therefore, turns about the axis A1, since it is integral with the shaft 101, and about the axis A2 since the meshing of the gears 41 and 42 induces this rotary motion.

Therefore, similarly to what is indicated above with reference to the apparatus 16, as is better described below, the head 17, and more precisely the nozzle 18 supporting element 108, is mobile according to a law of motion consisting of a first rotary movement about the first axis A1 and a second rotary movement about the second axis A2.

As illustrated in FIGS. 4 and 5, the nozzle 18 supporting element 108 comprises an end portion 115 having an external face 115a which roughly has the shape of a spherical cap.

With reference to FIG. 4, the head 17 has an end portion 117 which, with the head 17 in its second, non-operating configuration, forms a wall 118 that roughly has the shape of a spherical cap and that partly delimits the chamber 15.

In detail, with reference to the apparatus 16', the end portion 117 of the head 17 consists of a half-sphere comprising part of the body 105, part of the first, side plug 106 and the second plug 107.

As illustrated in FIGS. 2, 3, 4 and 5, and with reference to both of the embodiments 16 and 16' of the washing apparatus disclosed, the arm 19 and the head 17 are supported and guided by respective guide rings 113 housed in respective ring-shaped recesses made in the supporting and housing structure 23.

Similarly, a scraper ring 114 and an O-ring 114a are positioned in respective ring-shaped recesses.

A pipe 119, illustrated in detail only in the respective section extending inside the element 108, supplies the washing fluid F from a reserve unit U to the nozzles 18 on the element 108.

The motor means represented with the block M drive not only the rotation of the shaft 101 about the axis A1, but also the translational motion of the arm 19 along its axis B.

If the fluid F is in the liquid state, drying means, not illustrated, are fitted, communicating with the chamber 15 and designed to dry the chamber 15 when it has been washed.

Advantageously, the drying means comprise a compressed air source communicating with the inside of the chamber 15 by means of a channel. Said channel may consist of the pipe 119.

Advantageously, the washing apparatus 16, 16' can also be connected to an extractor apparatus, communicating with the inside of the chamber 15 by means of a respective channel and designed to extract the washing fluid F and any loose material residues from the chamber 15.

The extractor apparatus, not illustrated, is also designed to depressurize the chamber 15, that is to say, to bring the pressure inside the chamber 15 to a value lower than the atmospheric pressure, at least during chamber washing, so as to prevent any fluid F escaping.

In alternative embodiments, not illustrated, of the washing apparatus disclosed, there may be any number of nozzles 18 and they may be of any type, according to the chamber 15 geometry and the material to be washed. The head 17 may also be mobile according to any law of motion, designed to effectively direct the washing fluid F inside the chamber 15.

In practice, the apparatus 16, 16' is used for washing parts exposed to passing or standing loose materials.

In the embodiment illustrated, as said, one example of such parts is represented by the valve device 1 and, more specifically by the chamber 15 which is delimited at the top and at the bottom by the two closing elements 10, 11 and at the sides by the ring-shaped body 5.

If the device 1 is located in a polluted or uncontrolled environment, the chamber 15 may be washed before unloading the material, to avoid polluting the material in any way.

The washing is preferably done after depressurizing the chamber 15 using the extractor means. Then, the orbital head 17 of the washing apparatus 16, 16' is inserted in the chamber 15 and the chamber 15 is cleaned.

After washing, preferably keeping the pressure in the chamber 15 lower than the atmospheric pressure, the chamber 15 is dried if the fluid F used is in the liquid state.

The elements 10 and 11 are then moved to their respective open positions, not illustrated and the loose material is unloaded through the pipe 3.

When unloading is complete, after returning the elements 10 and 11 to their respective closed positions, the chamber 15 may be washed again as described above to eliminate any unloaded material residues from the chamber 15 walls and, in particular, from the surfaces of the elements 10 and 11.

As said, it should be noticed that all washing and drying operations are preferably carried out at a pressure lower than the atmospheric pressure, to minimize the risk of any washing fluid escaping.

In detail, FIGS. 2 and 4 illustrate washing apparatuses 16 and 16' in the second, non-operating configuration, in which the orbital head 17 is at least partly outside the chamber 15.

In particular, with reference to FIG. 2, the head 17 of the apparatus 16 is substantially outside the chamber 15 whilst, with reference to FIG. 4, the head 17 of the apparatus 16' is substantially only half outside the chamber 15.

As is clearly shown by FIGS. 2 and 4, in said head 17 second, non-operating configuration, the walls 112, 118 of the respective end portions 111, 117 partly delimit the chamber 15.

Advantageously, with the respective head 17 in the second, non-operating configuration, both embodiments of the apparatus 16, 16' offer a non-existent or limited obstacle to the passage of the loose material through the pipe 3.

Starting from the head 17 second, non-operating configuration just described, the arm 19 is driven by the motor means M so that it translates along its axis B and brings the head 17 into the first, operating configuration, illustrated in FIGS. 3 and 5 with reference, respectively, to the embodiments 16 and 16' of the washing apparatus disclosed.

Once the first, operating configuration is reached, the motor means M drive the rotation of the shaft 101 and, therefore, by means of the bevel gear pair 40, also the nozzle 18 supporting element 108.

As already indicated, the supporting element 108, and consequently the nozzles 18 on it, rotates both about the axis A1, and about the axis A2. The resulting law of motion therefore consists of a first rotary movement about the first axis A1 and a second rotary movement about the second axis A2.

The fluid F is supplied from the reserve unit U through the pipe 119, the fluid F, as it comes out of the nozzles 18, striking the walls of the chamber 15 and washing them.

The orbital movement of the head 17, and in particular of the nozzle 18 supporting element 108, allows the jets of fluid F to be effectively directed at all zones of the chamber 15.

With reference to the portion 110 of the element 108 of the apparatus 16, means, not illustrated, are advantageously fitted, for detecting the position of the portion 110 so as to detect when it reaches its end position, illustrated in FIGS. 6 and 7, in which the generating lines of the cylindrical segment are substantially parallel with the first axis A1. Only in this position can the head 17 be inserted in the respective supporting and housing structure 23 again.

At the end of the washing operations, translation of the arm 19 driven by the motor means M returns the head 17 of each apparatus 16, 16' to its second, non-operating configuration, in which it is at least partly inside the respective supporting and housing structure 23.

Advantageously, as illustrated in FIGS. 2 and 4, in the head 17 second, non-operating configuration, the respective nozzles 18 are blocked by portions of the structure 23, or of the head 17 itself, and do not give onto the chamber 15. This guarantees the cleanness of the pipe 119 and of the nozzles 18 and limits the risks of contamination as far as possible.

Thanks to the presence of the scraper ring 114 and the O-ring 114a, the structure 23 forms a fluid-tight housing cavity for the head 17 of the apparatus 16, 16'.

Advantageously, the scraper ring 114 and the O-ring 114a guarantee that the chamber 15 is sealed closed and prevent any material unloaded through the valve device 1 from escaping.

The invention described has evident industrial applications and may be subject to modifications and variations without thereby departing from the scope of the inventive concept. Moreover, all the details of the invention may be substituted by technically equivalent elements.

The invention claimed is:

1. A washing apparatus, in particular for washing parts exposed to the presence and/or passage of a flow of loose material, said parts forming a chamber, the apparatus comprising an orbital head for supporting at least one nozzle for dispensing a washing fluid in the chamber, wherein the head is mobile between a first, operating configuration in which the head is inserted in the chamber and a second, non-operating configuration, in which the head is at least partly outside the chamber and at least partly inside a fluid-tight housing cavity; the chamber having a central axis, wherein the orbital head rotates about a first axis of rotation substantially transversal to said central axis; wherein the nozzle is located on a respective supporting element, said element in turn supported by the orbital head and rotating relative to the head about a second axis of rotation substantially transversal to the first axis.

2. The apparatus according to claim 1, wherein the head is operatively attached to a mobile arm which moves the head between said first and second configurations.

3. The apparatus according to claim 1, wherein the head comprises a first end portion designed to form, in said second, non-operating configuration, a wall partly delimiting the chamber.

4. The apparatus according to claim 3, wherein the head has a substantially cylindrical shape.

5. The apparatus according to claim 3, wherein the wall has a substantially flat surface.

6. The apparatus according to claim 3, wherein the wall has at least a roughly circular shape.

7. The apparatus according to claim 3, wherein the head has at least a partly spherical shape.

8. The apparatus according claim 3, wherein the wall has the shape of a spherical cap.

9. The apparatus according to claim 1, wherein the nozzle is mobile according to a law of motion consisting of a first rotary movement about the first axis and a second rotary movement about the second axis.

10. The apparatus according to claim 1, wherein the head is mobile between a first, operating configuration in which the head is inserted in the chamber and a second, non-operating configuration, in which the head is at least partly outside the chamber, the head comprises a first end portion designed to form, in said second, non-operating configuration, a wall partly delimiting the chamber, the head has a substantially cylindrical shape, and the supporting element comprises a portion roughly having the shape of a cylindrical segment, the portion being mobile in rotation about the axis at least between an end position in which the generating lines of the cylindrical segment are substantially parallel with the first axis and a plurality of positions in which said generating lines are skew relative to the first axis.

11. The apparatus according to claim 10, wherein, in said end position, the supporting element has a curved face connected to the remaining part of the head, forming said cylindrical head shape.

12. The apparatus according to claim 1, wherein the head is mobile between a first, operating configuration in which the head is inserted in the chamber and a second, non-operating configuration, in which the head is at least partly outside the chamber, the head comprises a first end portion designed to form, in said second, non-operating configuration, a wall partly delimiting the chamber, the head has at least a partly spherical shape, and the supporting element comprises a portion with a face that roughly has the shape of a spherical cap.

13. The apparatus according to claim 12, wherein said face is connected to the remaining part of the head, forming said at least partly spherical head shape.

14. The apparatus according to claim 1, wherein the orbital head comprises a plurality of nozzles for dispensing the washing fluid.

15. The apparatus according to claim 14, wherein the head is mobile between a first, operating configuration in which the head is inserted in the chamber and a second, non-operating configuration, in which the head is at least partly outside the chamber, and, in the head second, non-operating configuration, the nozzles are at least partly blocked and do not give onto the chamber.

16. The apparatus according to claim 4, wherein the wall has a substantially flat surface.

17. The apparatus according to claim 4, wherein the wall has at least a roughly circular shape.

18. The apparatus according to claim 5, wherein the wall has at least a roughly circular shape.

19. The apparatus according to claim 16, wherein the wall has at least a roughly circular shape.

20. The apparatus according to claim 9, wherein the head is mobile between a first, operating configuration in which the head is inserted in the chamber and a second, non-operating configuration, in which the head is at least partly outside the chamber, the head comprises a first end portion designed to form, in said second, non-operating configuration, a wall partly delimiting the chamber, the head has a substantially cylindrical shape, and the supporting element comprises a portion roughly having the shape of a cylindrical segment, the portion being mobile in rotation about the axis at least between an end position in which the generating lines of the cylindrical segment are substantially parallel with the first axis and a plurality of positions in which said generating lines are skew relative to the first axis.

21. The apparatus according to claim 20, wherein, in said end position, the supporting element has a curved face connected to the remaining part of the head, forming said cylindrical head shape.

22. The apparatus according to claim 9, wherein the head is mobile between a first, operating configuration in which the head is inserted in the chamber and a second, non-operating configuration, in which the head is at least partly outside the chamber, the head comprises a first end portion designed to form, in said second, non-operating configuration, a wall partly delimiting the chamber, the head has at least a partly spherical shape, and the supporting element comprises a portion with a face that roughly has the shape of a spherical cap.

23. The apparatus according to claim 22, wherein said face is connected to the remaining part of the head, forming said at least partly spherical head shape.

24. The apparatus according to claim 23, wherein the head is mobile between a first, operating configuration in which the head is inserted in the chamber and a second, non-operating configuration, in which the head is at least partly outside the chamber.

25. The apparatus according to claim 24, wherein, in said second, non-operating configuration, the head is at least partly inside a fluid-tight housing cavity.

26. The apparatus according to claim 25, wherein the head is operatively attached to a mobile arm which moves the head between the first and second configurations.

27. A valve device comprising:
a pipe,
a first closing element mobile between a first position in which said first closing element opens the pipe and a second position in which said first closing element seals the pipe closed, and
a second closing element, mobile between a first position in which said second closing element opens the pipe and a second position in which said second closing element seals the pipe closed,
the pipe and the first and second closing elements in their respective second closed positions forming a chamber, the valve device comprising, for chamber washing, a washing apparatus according to claim 1.

28. A washing apparatus, in particular for washing parts exposed to the presence and/or passage of a flow of loose material, said parts forming a chamber, the apparatus comprising an orbital head for supporting at least one nozzle for dispensing a washing fluid in the chamber, wherein the head is mobile between a first, operating configuration in which the head is inserted in the chamber and a second, non-operating configuration, in which the head is at least partly outside the chamber and at least partly inside a fluid-tight housing cavity, wherein the orbital head rotates about a first axis of rotation substantially transversal to a central axis of the chamber, wherein the nozzle is located on a respective supporting element and said supporting element is in turn supported by the orbital head and rotates relative to the head about a second axis of rotation substantially transversal to the first axis and wherein the nozzle is mobile according to a law of motion consisting of a first rotary movement about the first axis and a second rotary movement about the second axis.

29. A washing apparatus, in particular for washing parts exposed to the presence and/or passage of a flow of loose material, said parts forming a chamber, the apparatus comprising an orbital head for supporting at least one nozzle for dispensing a washing fluid in the chamber, wherein the head is mobile between a first, operating configuration in which the head is inserted in the chamber and a second, non-operating configuration, in which the head is at least partly outside the chamber and at least partly inside a fluid-tight housing cavity; wherein the orbital head comprises a plurality of nozzles for dispensing the washing fluid; wherein the head is mobile between a first, operating configuration in which the head is inserted in the chamber and a second, non-operating configuration, in which the head is at least partly outside the chamber, and, in the head second, non-operating configuration, the nozzles are at least partly blocked and do not give onto the chamber.

* * * * *